United States Patent [19]
Awane et al.

[11] Patent Number: 5,781,905
[45] Date of Patent: Jul. 14, 1998

[54] PROGRAM GENERATING METHOD COMBINING DATA ITEM PART WITH DATABASE MANIPULATION PART

[75] Inventors: Satoshi Awane, Chigasaki; Osamu Ohno, Funabashi; Yosuke Morioka, Kawasaki; Atsuhiro Noguchi, Ichikawa, all of Japan

[73] Assignee: Hitachi, Ltd., Tokyo, Japan

[21] Appl. No.: 531,615

[22] Filed: Sep. 21, 1995

[30] Foreign Application Priority Data

Sep. 12, 1994 [JP] Japan .................................. 6-226181

[51] Int. Cl.$^6$ ................................................ G06F 17/30
[52] U.S. Cl. ........................... 707/102; 707/2; 707/103; 345/339; 395/676; 395/701
[58] Field of Search ........................... 395/603, 604, 395/613, 614, 615, 333–335, 767, 201, 701

[56] References Cited

U.S. PATENT DOCUMENTS

| | | | |
|---|---|---|---|
| 5,414,847 | 5/1995 | Tsukakoshi | 395/702 |
| 5,553,278 | 9/1996 | Suzuki et al. | 395/602 |
| 5,566,330 | 10/1996 | Sheffield | 395/604 |

OTHER PUBLICATIONS

"Fundamentals of Database Systems", Elmasro & Navathe, 2nd Ed., pp. 26–31, Addison–Wesley Publishing Company, Mar. 1994.

Primary Examiner—Thomas G. Black
Assistant Examiner—Hosain T. Alam
Attorney, Agent, or Firm—Antonelli, Terry, Stout & Kraus, LLP

[57] ABSTRACT

Data item parts and database manipulation parts are prepared in advance, and a business transaction program is generated by combining the data item parts and the database manipulation parts in accordance with a business transaction specification. The data item part includes a data unit and a procedure unit, which is provided for each data item to be processed by the business transaction program, the data unit storing data to be processed, and the procedure unit storing procedure information defining the process contents of the data to be processed. The database manipulation part includes a data unit and a procedure unit, which is provided for each table of a database for storing data to be processed by the business transaction program, the procedure unit storing procedure information defining database manipulation, the database manipulation including addition, update, deletion, search, or the like of a database record, the data unit storing data of the database record and a pointer to the data item part for processing the data in the database record.

7 Claims, 9 Drawing Sheets

FIG. 5

| | | | DATA REPRESENTATION FORMAT 510 | |
|---|---|---|---|---|
| ATTRIBUTE NAME 405 | ATTRIBUTE VALUE 406 | MEANING OF ATTRIBUTE VALUE 507 | MALE 509 | FEMALE 508 |
| INITIAL VALUE 501 | NULL | SET NULL FOR INITIAL VALUE | - | - |
| | MALE | SET MALE FOR INITIAL VALUE | 1 | - |
| | FEMALE | SET FEMALE FOR INITIAL VALUE | - | 2 |
| INPUT FORMAT 502 / 505 / 506 | NUMERICAL CHARACTER | REQUEST NUMERICAL CHARACTER INPUT | 1 | 2 |
| | ALPHABETICAL CHARACTER | REQUEST ALPHABETICAL CHARACTER INPUT | M | F |
| | DIALOG | REQUEST DIALOG SELECTION | SELECTION BY DIALOG INSTRUCTION | |
| OUTPUT FORMAT 503 | NUMERICAL CHARACTER | DISPLAY OUTPUT OF NUMERICAL CHARACTER | 1 | 2 |
| | ALPHABETICAL CHARACTER | DISPLAY OUTPUT OF ALPHABETICAL CHARACTER | M | F |
| | SYMBOL | DISPLAY OUTPUT OF SYMBOL | ♂ | ♀ |
| STORAGE FORMAT 504 | NUMERICAL CHARACTER | STORE NUMERICAL CHARACTER IN DATABASE | 1 | 2 |
| | ALPHABETICAL CHARACTER | STORE ALPHABETICAL CHARACTER IN DATABASE | M | F |

FIG. 6

| VALUE OF "EMPLOYEE SEX" DATA ITEM | MEANING |
|---|---|
| 1 | INDICATE "MALE" |
| 2 | INDICATE "FEMALE" |

FIG. 7

| DATA ITEM NAME | DATA ITEM PART | ATTRIBUTE VALUES | | | |
|---|---|---|---|---|---|
| | | INITIAL VALUE | INPUT FORMAT | OUTPUT FORMAT | STORAGE FORMAT |
| EMPLOYEE NAME | NAME | NULL | ALPHA-BETICAL CHARACTER | ALPHA-BETICAL CHARACTER | ALPHA-BETICAL CHARACTER |
| EMPLOYEE BIRTH DATE | DATE 1 | NULL | YYYYMMDD | NYY"YEAR"MM"MONTH"DD"DAY" | YYYYMMDD |
| EMPLOYEE EMPLOYED DATE | DATE 2 | THIS YEAR, APRIL 1 | YYYYMMDD | NYY"YEAR"MM"MONTH"DD"DAY" | YYYYMMDD |
| EMPLOYEE SEX | SEX | NULL | DIALOG | ALPHA-BETICAL CHARACTER | ALPHA-BETICAL CHARACTER |
| EMPLOYEE ADDRESS | ADDRESS | NULL | DIALOG | ALPHA-BETICAL CHARACTER | ALPHA-BETICAL CHARACTER |
| EMPLOYEE LAST ACADEMIC CAREER | SCHOOL | NULL | DIALOG | ALPHA-BETICAL CHARACTER | ALPHA-BETICAL CHARACTER |

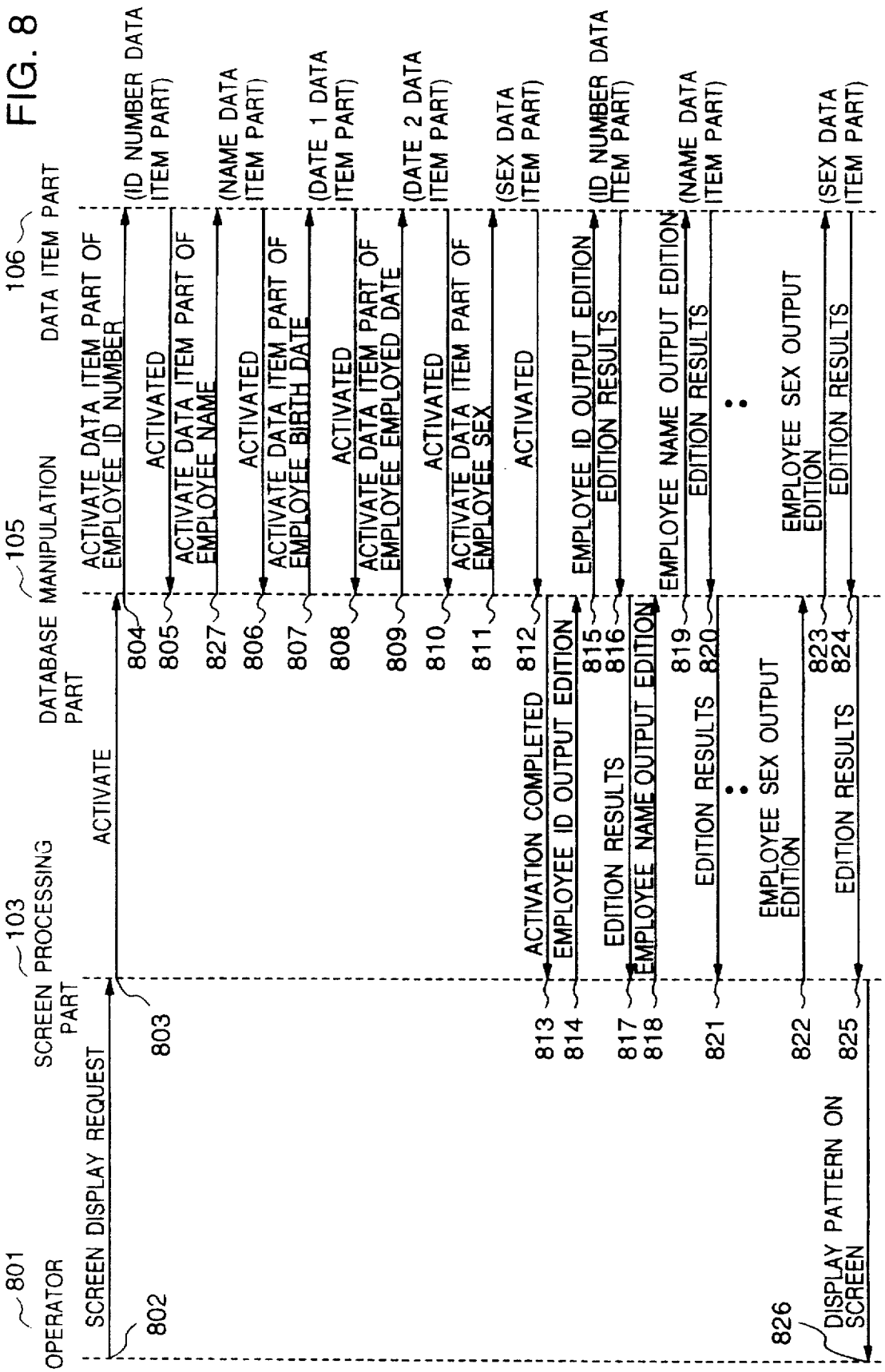

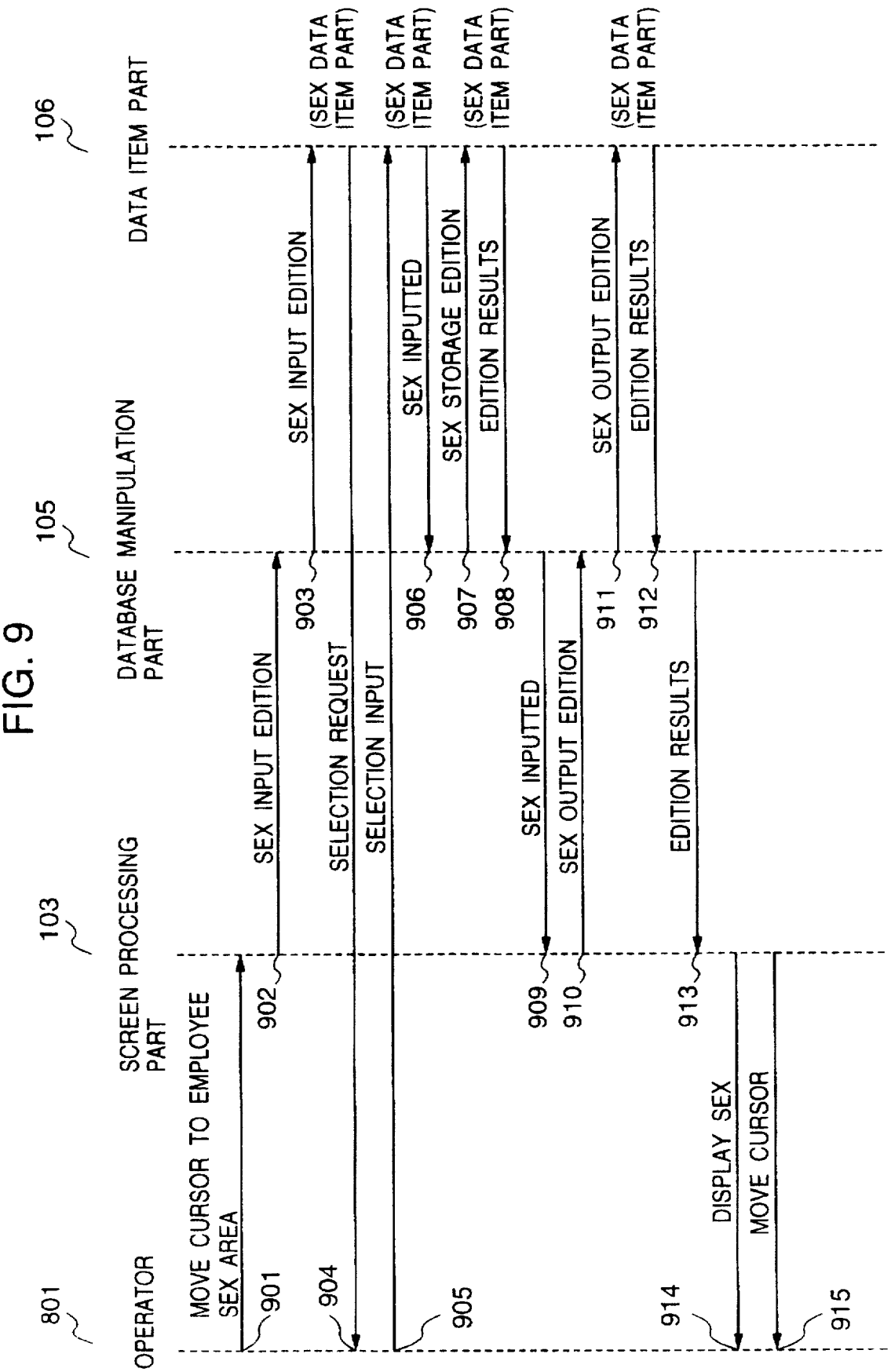

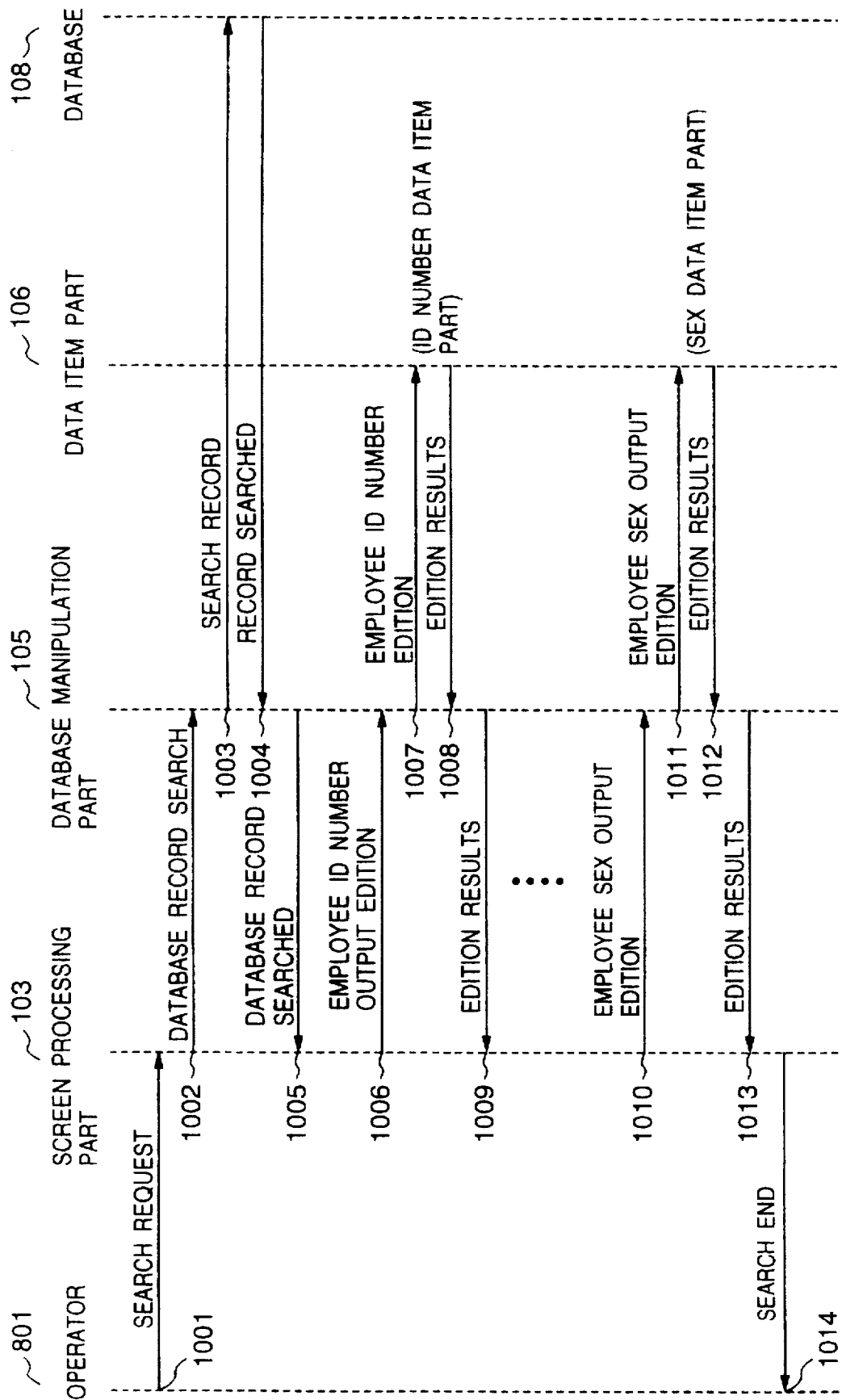

PROGRAM GENERATING METHOD COMBINING DATA ITEM PART WITH DATABASE MANIPULATION PART

BACKGROUND OF THE INVENTION

1 Field of the Invention

The present invention relates to a method for generating a database access program, and more particularly to a programming method using program parts for respective data items.

2 Description of the Related Art

As a conventional programming method using program parts, there is a programming method using a program product "UIBT (User Interface Building Tool)".

UIBT is a development aid tool for GUI (Graphical User Interface). This tool uses X Window System and Hitachi Motif and presents a variety of functions.

However, this development tool constructs a GUI part by using Motif programming codes. It is therefore difficult for users not experienced in Motif programming to construct a GUI part.

In order that even a novice can easily construct a GUI part, a method of constructing a GUI part visually matching a developer's image and controlling the arrangement of GUI parts has been developed. This method is provided with a fundamental GUI part group called a UI object and a part construction editor called a UIBT editor. In addition to this method, a function group called a UIBT library for defining the motion of display patterns on a display screen has been provided.

With this method and library, business application developers can visually construct GUI parts and form GUI display patterns efficiently.

However, this conventional technique can define only a GUI display pattern and motion. Therefore, if an input check and an output edition of data of a data item which is processed inside of the application program are to be performed, or if the database is to be manipulated, the program is required to be modified and written at the level of source code. If a data item, the format of each data item, or the like is to be changed, it is necessary to modify source codes.

SUMMARY OF THE INVENTION

It is a first object of the present invention to provide a method of generating a program by using program parts, the method allowing a business program dealing with various data items to be generated with ease.

It is a second object of the present invention to provide a method of generating a program by using program parts, capable of flexibly dealing with a variety of business transactions.

In order to achieve the first object of the present invention, there is provided a method of generating a business transaction program, comprising the steps of: preparing a data item part including a data unit and a procedure unit for each data item to be processed by the business transaction program, the data unit storing data to be processed, and the procedure unit storing procedure information defining the process contents of the data to be processed; and preparing a database manipulation part including a data unit and a procedure unit for each table of a database for storing data to be processed by the business transaction program, the procedure unit storing procedure information defining data-base manipulation, the database manipulation including addition, update, deletion, and search of a database record, the data unit storing data in the database record and pointers to the data item parts for processing the data in the database record, wherein the data item part and the database manipulation part are combined in accordance with a business transaction specification.

In order to achieve the second object of the present invention, the data item part includes an attribute definition table for storing a plurality of attributes for determining a format of data, the database manipulation part defines which one of the plurality of attributes stored in the attribute definition table is used, and data processing corresponding to a desired attribute in the plurality of attributes is performed.

A program part for processing the input/output data on the display screen, a program part for manipulating a database, and a program part for processing data of each data item are all independent program parts. Therefore, even program novices can easily generate a program which matches a desired business transaction.

If a business transaction is changed, either a program part is replaced or procedure information is redefined. Therefore, maintenance becomes simple. In addition, since a program part once generated can be used for another business program, reuse of program parts can be enhanced, productivity is improved, and a highly reliable program can be generated.

The data item part is provided with a plurality type of functions even for the same purpose procedure and a desired procedure function can be selected by externally designating attribute values. Therefore, a variety of business transactions can be flexibly dealt with.

BRIEF DESCRIPTION OF THE DRAWINGS

FIG. 5 is a diagram showing an example of the contents of an attribute definition table.

FIG. 6 is an example of a sex distinction code table.

FIG. 7 is a diagram showing an example of the contents of an attribute definition file.

FIG. 8 is a sequence chart illustrating the operation to be performed when display patterns are displayed on a screen, according to an embodiment.

FIG. 9 is a sequence chart illustrating the operation to be performed when an employee sex distinction is designated, according to an embodiment.

FIG. 10 is a sequence chart illustrating the operation to be performed when a database record is searched.

DETAILED DESCRIPTION OF THE PREFERRED EMBODIMENTS

Figure 1:
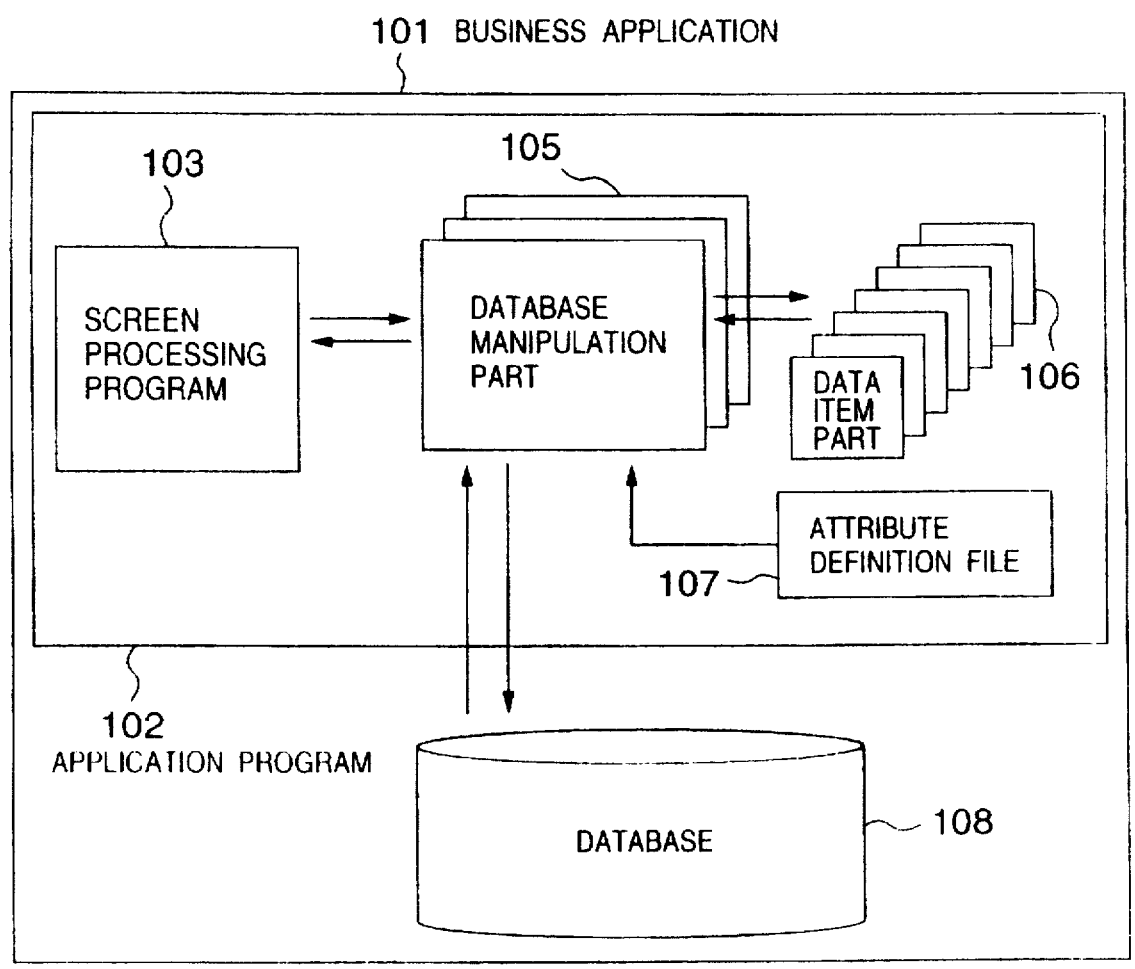
FIG. 1 is a schematic diagram showing the software structure of a business application according to an embodiment of the invention.

FIG. 1 is a schematic diagram showing the software structure of a business application according to an embodiment of the invention. This embodiment is directed to an interactive business application which allows an operator to progress a database modification process by performing an input operation to a display pattern on the screen of a display monitor.

The business application 101 is constituted by an application program 102 and a database 108.

The application program 102 to be generated is constituted by a screen processing program 103, a plurality of database manipulation parts 105 each corresponding to each of a plurality of tables stored in the database 108, a plurality of data item parts 106, and an attribute definition file 107 for linking each data item part with a data item constituting each table.

The screen processing program 103 operates to display patterns used for the input/output of business data on a display unit such as a monitor display, and to receive data from an input device such as a keyboard and a mouse.

In response to an input by an operator, the database manipulation part 105 accesses the database 108, checks input data, or processes input data.

The screen processing program 103 also functions to pass an operator request to the database manipulation part 105. In response to a request from the screen processing program 103, the database manipulation part 105 accesses the database 108 or issues a process request to the data item part 106 in units of data item.

Prior to the description of each constituent element, an example of a simple business application adaptable to this invention will be described with reference to FIG. 2.

Figure 2:
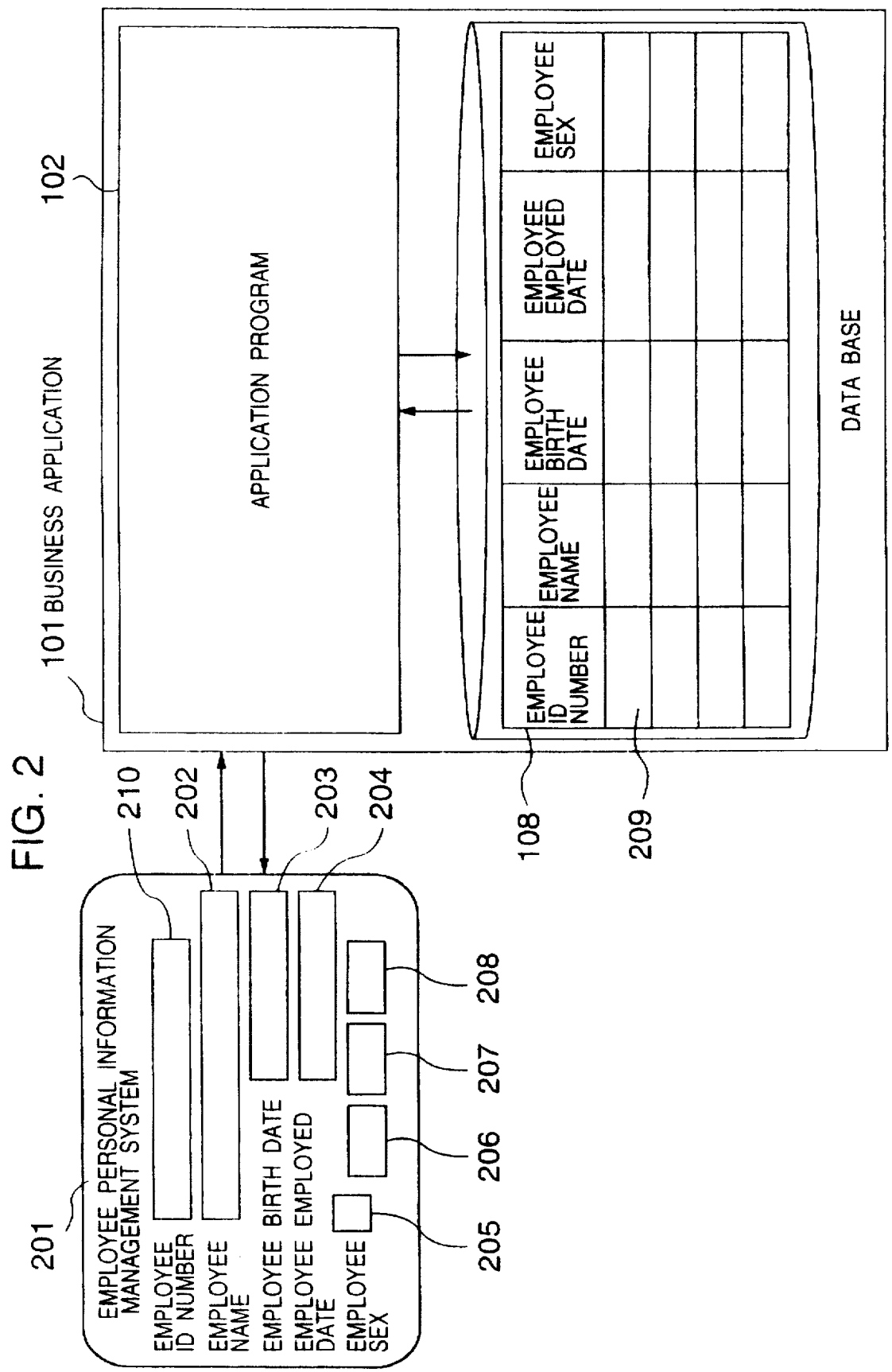
FIG. 2 is a schematic diagram showing an example of the business application.

FIG. 2 shows an example of the business application 101 for the management of personal data of each employee of a company. This business application 101 stores an employee information table 209 in the database 108, the employee information table 209 storing the personal data of each employee.

An operator of the business application 101 selects one of an employment button 206, a retirement button 207, and a change button 207 on a personal information screen 201 upon operation of a keyboard or a mouse, in accordance with employment, retirement, or data change of each employee. Thereafter, data is inputted from the keyboard to an employee identification number input field 210, an employee name input field 202, an employee birth date input field 203, an employee employed date input field 204, or an employee sex distinction input field to add, delete, or change a record in the employee information table 209.

Each constituent element of the invention will be described in detail in connection with the business application 101 shown in FIG. 2 applied to the invention.

Figure 3:
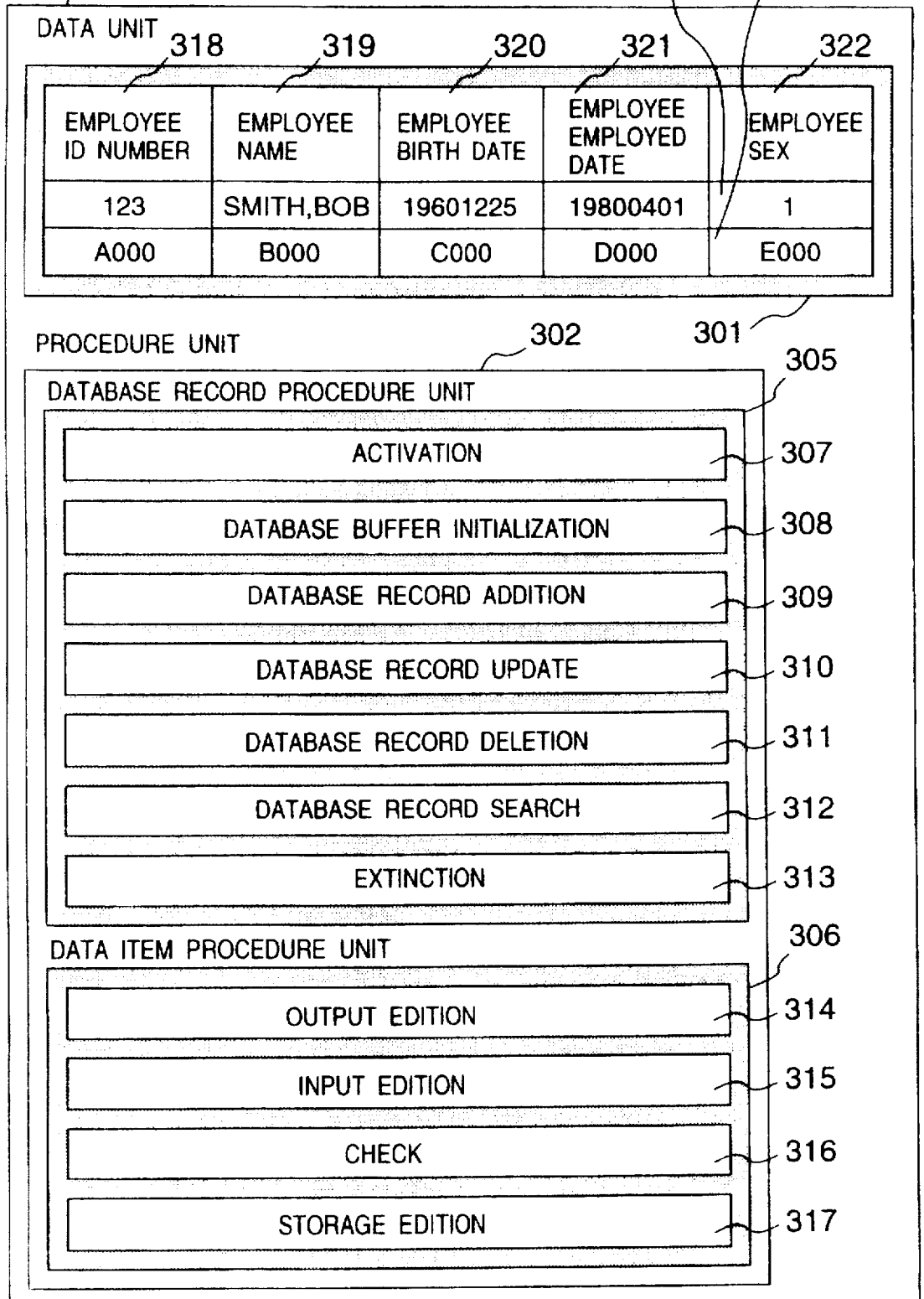
FIG. 3 is a diagram showing the detailed structure of a database manipulation part.

FIG. 3 is a diagram showing the detailed structure of the database manipulation part 105 which performs the database manipulation such as record generation, record update, record deletion, and record search of the database 108 which stores data for the application program 102 to be generated. The database manipulation part 105 is constituted by a data unit 301 and a procedure unit 302.

The data unit 301 is constituted by a database buffer 303 and a data item part pointer table 304. The database buffer 303 is a storage area for temporarily storing a necessary database record while the operator performs the business management by using the business application 101.

For the execution of the application program 102, the data item part pointer table 304 stores pointers for linking each data item in the database buffer 303 with the corresponding data item part 106. The data item includes an employee identification number 318, an employee name 319, an employee birth date 320, an employee employed date 321, and an employee sex distinction 322. Upon request from an operator, the database manipulation part 105 is stored in a main memory, and an activation procedure 307 is executed to activate the database manipulation part 105. At this time, the database manipulation part 105 activates a necessary data item part 106 and stores a pointer (practically a main memory address) to the data item part 106.

Activation of the data item part and the database manipulation part means that a data item part and a database manipulation part already formed and stored in a disk or the like are loaded in the main memory, and necessary data is set to the data item part and the database manipulation part so as to make these parts executable.

In correspondence with the data unit 301, the procedure unit 302 for the database record includes a database record procedure unit 305 and a data item procedure unit 306. The database record procedure unit 305 stores procedures necessary for the database manipulation, such as activation 307, database buffer initialization 308, database record addition 309, database record update 310, database record deletion 311, database record search 312, and extinction 313.

The activation procedure 307 develops the data unit 301 of a database manipulation part 105 and a corresponding data item part 106 on the main memory to make them executable.

In the activation procedure 307, a memory area for the data part 301 is first reserved. Then, the data item parts 106 corresponding to data items in the database buffer 303, including the employee identification number 318, an employee name 319, an employee birth date 320, an employee employed date 321, and an employee sex distinction 322, are loaded in the main memory, and addresses of the data item parts 106 on the main memory are stored in the data item part pointer table 304.

In this case, correspondence between each data item (318, 319, 320, 321, 322) and its data item part 106 is defined in advance in the attribute definition file 107 and stored in a file or the main memory.

The database buffer initialization procedure 308 is a procedure for clearing the database buffer 303 and setting an initial value to each data item (318, 319, 320, 321, 322).

The database record addition procedure 309 is a procedure for inserting a database record temporarily stored in the database buffer 303 into the database 108.

The database record update procedure 310 is a procedure for replacing the contents of the database record in the database 108 by the contents of the database buffer 303.

The database record deletion procedure 311 is a procedure for deleting the database record in the database 108, the deleted database record having the same employee identification number as that in the database buffer 303.

The database record search procedure 312 is a procedure for reading the database record having the same employee identification number 318 as that in the database buffer 303 from the database 108 and loading it in the database buffer 303.

The extinction procedure 313 is a procedure for extinguishing or deleting the database manipulation part 105 itself from the main memory. At this time, the memory area reserved upon execution of the activation procedure 307 is also released. Prior to this operation, a request is issued for sequentially executing the extinction procedure for those data item parts 106 activated by the database manipulation part 105.

The data item procedure unit 306 is used for responding to a process request for each data item from the screen process program and executing the corresponding data item part 106. The data item procedure unit 306 can define four procedures including output edition 314, input edition 315, check 316, and storage edition 317, respectively in units of data item. With the data item procedure unit 306, it is possible to select one of these four procedures such as output edition for the execution by the data item part 106. Specifically, although the data item procedures such as output edition, input edition, check, and storage edition are executed substantially by the data item part 106, the data item procedure unit 306 can select one of the procedures to be executed by the data item part 106.

Figure 4:
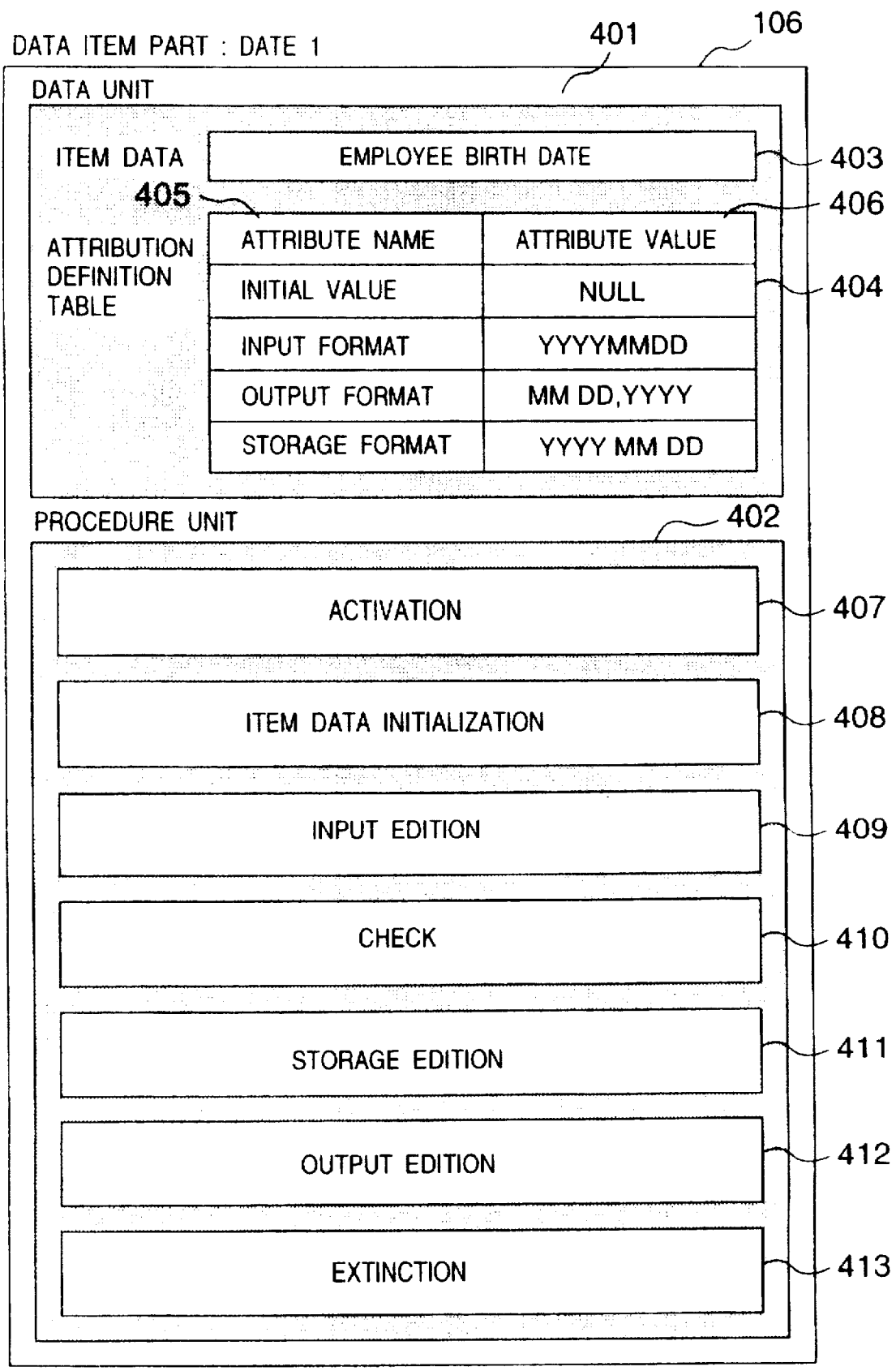
FIG. 4 is a diagram showing the detailed structure of a data item part.

FIG. 4 is a diagram showing the detailed structure of the data item part 106.

The data item part 106 is a program part for independently processing each data item such as a name, a date, and an academic career.

In this embodiment, the data item part 106 has a data unit 401 and a procedure unit 402. The data unit 401 stores data of its data item for the execution of the data item part 106. The procedure unit 402 executes a data item process by accessing the data in the data unit 401 upon request from the database manipulation part 105.

The data unit 401 has an item data area 403 and an attribute definition table 404. The item data area 403 is a work area for storing data while the data item part 106 executes a procedure defined in the procedure unit 402, the stored data having a copy of a value of a necessary data item in the database buffer 303 of the database manipulation part 105 after the copy being converted into the form processed in the data item part.

The attribute definition table 404 is an area for storing parameters necessary for the execution of the data item part 106. Each parameter is constituted by a pair of an attribute name 405 and an attribute value 406.

Upon reception of an execution request for an activation procedure 407 from the database manipulation part 105, the data item part 106 receives the pairs of attribution names 405 and attribution values which the database manipulation part 105 reads from the attribution definition file 107, and stores them in the attribution definition table 404.

The procedure unit 402 has seven procedures including the activation procedure 407, an item data initialization procedure 408, an input edition procedure 409, a check procedure 410, a storage edition procedure 411, an output edition procedure 412, and an extinction procedure 413. Data to be processed is passed from the database manipulation part 105 to the item data area 403 of the data item part 106.

The activation procedure 407 is a procedure for developing the data in the data unit 401 of the data item part 106 on the main memory. At this time, the attribute names 405 and attribute values 406 are received from the database manipulation part 105.

During the activation procedure 407, a procedure for setting an initial value into the item data area 403 is also performed.

The item data initialization procedure 408 is a procedure for setting an initial value to the item data area 403 of the data item part 106. An attribute value 406 corresponding to the attribute name 405 "Initial Value" of the attribute definition table 404 is set to the item data area 403.

The input edition procedure 409 is a procedure for converting data in the database buffer 303 into an input format for the screen display, when the operator of the application program 101 is requested to input or correct a value of a data item. The data in the item data area 403 is converted into a format of the attribute value 406 corresponding to the attribute name 405 "Input Format" of the attribute definition table 404.

The check procedure 410 is a procedure for verifying whether the data format and value inputted by the operator using the display is suitable for the business application. It is checked whether the data matches a format of the attribute value 406 corresponding to the attribute name 405 "Input Format" of the attribute definition table 404. If the data matches the format, the data is stored to item data 403.

The storage edition procedure 411 is a procedure for converting data entered by an operator into a storage format for storing the data in the database buffer 303. The data in the item data area 403 is converted into a format of the attribute value 406 corresponding to the attribute name 405 "Storage Format" of the attribute definition table 404.

The output edition procedure 412 is a procedure for converting a format for storing data of a data item in the database buffer 303 into a format for displaying data on the screen display. The data in the item data area 403 is converted into a format of the attribute value 406 corresponding to the attribute name 405 "Output Format" of the attribute definition table 404.

The converted data is again passed to the database manipulation part 105.

The extinction procedure is a procedure for extinguishing or deleting the data item part 106 itself from the main memory and releasing the used memory area.

On these procedures 407, 408, 409, 410, 411, 412, and 413, for example, the output edit procedure 412 of the data item part 106 for "year, month, day" may express the date in the Japanese calendar format or in the European calendar format. In this manner, the attribute definition table 404 can designate one or more conversion styles. Namely, the attribute definition table 404 controls how each procedure 407, 408, 409, 410, 411, 412, 413 converts the data.

The attribute name 405 and attribute value 406 will be described with reference to FIG. 5, by taking the sex distinction data item part as an example.

In the example shown in FIG. 5, the attribute name 405 has four attribute names including an initial value 501, an input format 502, an output format, and a storage format. If an attribute value is a numerical character, values such as "1" 603 and "2" 604 are set in accordance with the code system defined in FIG. 6.

An initial value 501 of the attribute name 405 defines a default value of the data item. This default value is a parameter to be referred to by the item data initialization procedure 408 for initializing the data in the item data area 403 and by the activation procedure 407.

An input format 502 defines a format for the screen display when an operator of the business application 101 is requested to enter a value of the data item, and also defines the restriction conditions relative to the input format entered by the operator.

In this example shown in FIG. 5, if an alphabetical character 505 is designated as the attribute value 406 of the input format 502, "M" is displayed if the value in the item data area 403 is "1" (male) and "F" is displayed if "2" (female). If this combination is designated, the definition of the input format 502 includes the restriction conditions that an operator is requested to enter or correct data by using "M" or "F".

If a dialog 506 is designated as the input format 502, an operator can enter a sex distinction by clicking a dialog displayed by the data item part 106.

In the example shown in FIG. 5, the initial value 501, input format 502, output format 503, storage format 504, and etc. are the attribute names all the data item parts 106 should have in common. Each data item part 106 may have optional attribute names other than these attribute names depending upon the characteristics of data items to be dealt with.

In the above manner, by setting the attribute definition table 404 during the execution of the activation procedure 407 of the data item part 106, each procedure of the procedure unit 402 of the data item part 106 performs a process in conformity with the contents of the attribute definition table 404.

FIG. 7 is a diagram showing an example of the contents of the attribute definition file 107.

The attribution definition file 107 is a file for defining which one of a plurality of data item parts 106 is requested to perform an operation for a data item, the data item parts being prepared for each of a data item name 702 the business application 101 handles. In each row of the data item name 702, a title of the data item part 106 and attribute values 406 are defined. The attribute values 406 are a combination of the initial value 501, input format 502, output format 503, and storage format 504.

For example, the data item of an employee employed date 703 defines "This year, April 1" as the initial value 501 and designates "YYYYMMDD" as the input format 502.

The business application 101 is generated practically in the following manner.

First, a database manipulation part 105 is generated for each table constituting the database, the table including a logical table which is made by joining a plurality of tables. The data item part 106 is also generated for each data item constituting each table of the database. Both the database manipulation part 105 and the data item part 106 are software programs. Although the structure of these parts are as shown in FIGS. 3 and 4, a plurality of database manipulation parts 105 and data item parts 106 have many common processes. Therefore, common processes may be collected and called when necessary, while each database manipulation part 105 and each data item part 106 are made to have only those processes specific thereto. If parts generated in the past are usable, they are copied.

Next, the attribute definition file 107 is generated.

The attribute values 406 and the title of the data item part name 106 are defined and loaded in the attribute definition file 107 in the format shown in FIG. 7. The attribute values 406 determine the function of the data item part 106, and the title of the data item part 106 identifies which data item part is used. This file is generated by using an editor or the like. The data item and the data item part are not necessarily in one-to-one correspondence. If the attribute values of different data items are the same, a plurality of data items can share one data item part.

Next, the screen processing program 103 is generated. A GUI part like a conventional one is used as an interface to the display screen. In addition, the screen process program 103 is generated so as to pass an operator instruction entered on the display screen to the corresponding database manipulation part.

Lastly, the database manipulation part 105, data item part 106, and screen processing program are combined to generate the application program 102.

In this manner, the application program 102 is generated by independent program parts including the screen processing program 103 for processing the display screen of data input/output, the database manipulation part 105 for manipulating or processing the database 108, and the data item part 106 for processing each data item.

If the business transaction is changed, e.g., if a data item of a database table is changed, an associated program part is changed or replaced, and the attribute definition file is changed correspondingly. If the input/output format of a data item is to be changed, the attribute definition file is changed. Therefore, program modification is easy and the program part becomes reusable.

Next, how the application program 102 generated in the above manner runs will be described.

FIG. 8 is a sequence chart illustrating the operation from the start-up of the application program 102 by an operator to the display of display patterns.

First, an operator 801 enters a command to start up the application program 102 (Step 802).

The screen processing program 103 of the application program under running activates an associated database manipulation part 105 (Step 803).

The database manipulation part 105 sequentially activates the data item parts 106 corresponding to the employee identification number, employee name, employee birth date, employee employed date, and employ sex distinction, for each data item to be processed (Steps 804, 827, 807, 809, and 811).

At this time, the database manipulation part 105 fetches the title of the data item part 106 to be activated, attribute names 405, and attribute values 406 for each data item from the attribute definition file 107, and passes them to the data item part 106.

After all the data item parts 106 are activated (Step 812), the database manipulation part 105 notifies the screen processing program 103 of the activation completion (Step 813).

The screen processing program 103 requests the output edition of each data item in order to display an initial display pattern on the screen (Steps 814, 818, 822).

Upon reception of the output edition request, the database manipulation part 105 requests the data item part for each data item to perform an output edition (Steps 815, 819, 823), and passes the output edition results which were returned from the data item part 106 (steps 816, 820, 824), to the screen processing program 103 (Steps 817, 821, 825).

Upon reception of all the output edition results (Step 825), the screen processing program 103 operates to display a display pattern for each data item on the screen (Step 826).

FIG. 9 is a sequence chart illustrating the operation to be performed when an operator 801 inputs a value to a data item from the display screen.

In this example, a value is inputted to a data item "Employee Sex Distinction".

First, as an operator 801 moves a cursor to the employee sex distinction area on the screen and clicks it (Step 901), the screen processing program 103 requests the database manipulation part 105 to perform an input edition (Step 902).

The database manipulation part 105 issues an input edition request to the sex distinction part 106 (Step 903). The data item part 106 for the data item "Employee Sex Distinction" has already been activated in accordance with the attribute definition file 107 shown in FIG. 7.

In response to the input edition request, the sex distinction data item part 106 displays dialogs and requests the operator to select a proper dialog (Step 904). The operator 801 clicks the cursor at the displayed proper dialog to designate the employee sex (Step 905).

The sex distinction data item part 106 stores the data inputted by the operator 801 in the item data area 403, and notifies the database manipulation part 105 of the input completion (Step 906).

Next, the database manipulation part 105 requests the sex distinction data item part 106 to perform a storage edition (Step 907). In response to this request, the sex distinction data item part 106 converts the data in the data item area 403 into the storage format and returns it to the database manipulation part 105 (Step 908).

The database manipulation part 105 notifies the screen processing program 103 of a completion of a sex distinction input (Step 909).

The screen processing program 103 requests the database manipulation part 910 to perform an output edition of the inputted employee sex distinction data (Step 910), and then the database manipulation part 910 requests the sex distinction data item part 106 to perform an output edition (Step 911).

The output edition results obtained by the sex distinction data item part 106 are returned to the database manipulation part 105 (Step 912), and to the screen processing program 103 (Step 913).

The screen processing program 103 displays the output edition results returned from the sex distinction data item part 106 on the display screen (Step 914), and the operator moves the cursor to the next data item area (Step 915).

FIG. 10 is a sequence chart illustrating the operation to be performed when an operator enters a search instruction from the display screen. In this example, searched is a record for an employee identification number same as the value of the data item "Employee Identification Number".

First, as an operator 801 requests for a search (Step 1001), the screen processing program 103 requests the database manipulation part 105 to perform a database record search (Step 1002).

The database manipulation part 105 searches a record having an employee identification number same as that in the database buffer 303, from the employee information table 109 of the database 108 (Step 1003), loads the search results in the database buffer 303 (Step 1004), and notifies the screen processing program of a completion of the database record search (Step 1005).

The screen processing program 103 requests the database manipulation part 105 to perform an output edition of the searched data item "Employee Identification Number" (Steps 1006, 1010).

Upon reception of the output edition request, the database manipulation part 105 requests the data item part 106 for each data item to perform an output edition (Steps 1007, 1011), and passes output edition results which were returned from the data item part 106 (Steps 1008, 1012), to the screen processing program (Steps 1009, 1013).

After all the requested output edition results are received, the screen processing program 103 terminates the search (step 1014).

What is claimed is:

1. A method of generating a business transaction program comprising the steps of:

preparing a data item part, including a data unit and a procedure unit, for each data item to be processed by the business transaction program, the data unit storing the data item to be processed, and the procedure unit storing procedure information defining the process contents of the data item to be processed; and preparing a database manipulation part, including a data unit and a procedure unit, for each table of a database storing data items to be processed by the business transaction program, the procedure unit storing procedure information defining database manipulation, the database manipulation including addition, update, deletion, and search of a database record, the data unit storing said data items in the database record and a plurality of pointers pointing to said data item parts which correspond to said data items, for processing the data items in the database record, wherein one of said data item parts and said database manipulation part are combined in accordance with a business transaction specification.

2. A method according to claim 1, wherein each data item part includes an attribute definition table for storing a plurality of attributes for determining a format of the corresponding data item, said database manipulation part defines which one of the plurality of attributes stored in said attribute definition table is used, and performs data processing corresponding to a desired attribute in the plurality of attributes.

3. A method of generating a business transaction program for accessing a database, comprising the steps of:

preparing a database manipulation part for each table of the database, said database manipulation part performing database manipulation for each said table and including a buffer having a capacity equal to one table record and a procedure unit for performing the database manipulation;

preparing a data item part for each data item of each said table of the database, each of said data item parts performing a conversion process for its corresponding data item and including a buffer for storing a content of the corresponding data item and a procedure unit for performing the conversion process; and generating a program for calling said database manipulation part in accordance with the contents of a business transaction, wherein said database manipulation part passes the conversion process of each data item of a record under processing to a corresponding data item part.

4. A method according to claim 3, further comprising the step of:

generating a definition file defining conversion formats for all data items, the conversion formats satisfying the process contents, wherein said data item parts execute the conversion process of each data item in accordance with the contents of said definition file and the contents of a process request from said database manipulation part.

5. A method according to claim 3, wherein, said database manipulation part performs a record addition, record update, record deletion, and record search for a corresponding database table.

6. A method according to claim 3, wherein, said database manipulation part has addresses of corresponding data item parts.

7. A method of generating a business transaction program for accessing a database, comprising the steps of:

dividing a database process into a record unit process and a data item unit process;

preparing a database manipulation part for performing a record process of the database, in correspondence with the structure of records;

preparing a plurality of data item parts, each data item part for converting a format of one respective data item, in correspondence with the type of said one respective data item; and generating a business transaction program by combining said database manipulation part and said data item parts in accordance with the process contents.

* * * * *